March 25, 1930. S. I. CONE 1,751,540
METHOD OF GENERATING WORM GEARING
Filed June 27, 1925    2 Sheets-Sheet 1

Inventor
Samuel I. Cone
By Vernon E. Hodges
His Attorney

March 25, 1930. S. I. CONE 1,751,540
METHOD OF GENERATING WORM GEARING
Filed June 27, 1925 2 Sheets-Sheet 2
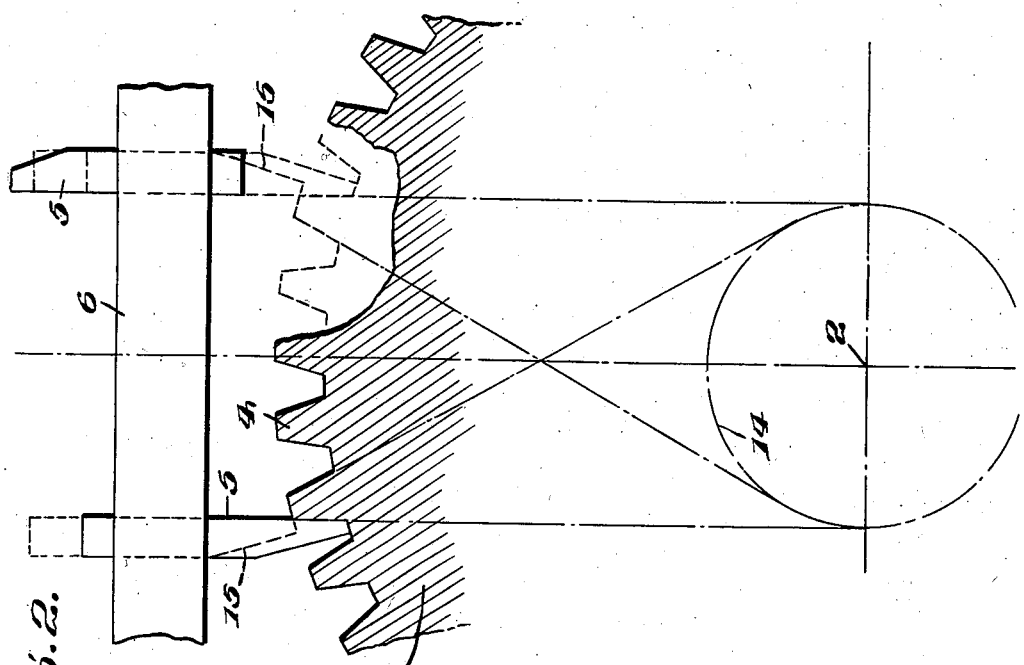
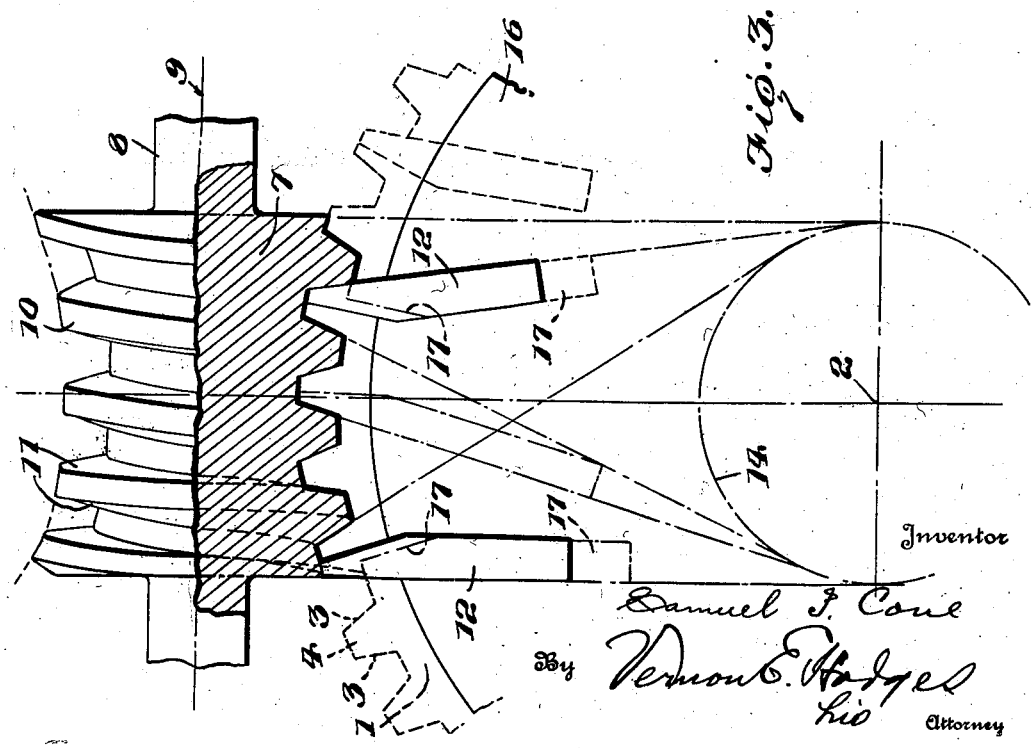
Inventor
Samuel I. Cone
By Vermont E. Hodges
his Attorney Patented Mar. 25, 1930

1,751,540

UNITED STATES PATENT OFFICE

SAMUEL I. CONE, OF PORTSMOUTH, VIRGINIA, ASSIGNOR TO CONE GEARING CORPORATION, OF NORFOLK, VIRGINIA, A CORPORATION OF VIRGINIA

METHOD OF GENERATING WORM GEARING

Application filed June 27, 1925. Serial No. 40,115.

This invention relates to the method of generating worm gearing, particularly an improved form of precision worm gearing.

It is an object of the present invention to form the members of a system of worm gearing with surfaces that can be easily cut, or so that both members of the system will be generated to a high degree of precision. Another object of the invention is to generate worm gearing in which the flanks of the worm wheel teeth have a twisted or warped surface correctly generated and disposed at an acute angle to each other and at acute angles to corresponding axial planes intersecting the teeth.

Another object of the invention is to provide a worm generated for proper intermeshing relation with the above described worm wheel which will give a long and continuous contact, the contact between the driving surfaces of the thread of the worm and the driven surfaces of the meshed teeth of the worm wheel being such that the surface of the entering convolution of the worm thread wipes a considerable portion of the surface of the worm wheel tooth at that end of the worm, and diminishes gradually on consecutive convolutions of the worm thread until the leaving convolution of the worm thread wipes a portion of the worm wheel tooth at that end of the worm.

Still another object of the invention is to provide a system of gearing permitting generating a worm either by using a cutting tool or tools mounted on a revolving table and so positioned as they can be moved into the work and along a line corresponding to the sides of the teeth of the worm wheel. The axis of the revolving table on which are mounted the cutting tools for generating the worm, and the axis of the cutter-bar for generating the gear wheel remain constant, and correspond to the working center distances, respectively, of the completed worm and wheel. The revolving table and worm blank are geared together to travel in the designed ratio. The method of generating the worm preferably comprises mounting a number of tools on the revolving table corresponding to the usual mid-plane of the worm wheel, with a means of lengthening or shortening the distances from the center of the revolving table to the ends of the tools; and by this means the designed center distances can be maintained, and by starting with the tools set against the face of the worm blank and gradually lengthening the tools, they will feed into the work and generate a thread on the worm of the correct angle, pitch and twist.

A further object of my invention is to provide a system of gearing permitting generating a worm wheel either by using a tool or tools, so that their cutting edges are in a position corresponding to that assumed by the sides of thread on the worm, and placed in such a position as to generate the angle, pitch and twist on the teeth to fit the above-described worm.

The method of generating the worm wheel is to mount the wheel blank on the revolving table with a revolving cutter-bar in the same positions formerly occupied respectively by the cutters and worm for generating the worm, or, in other words, to reverse the method of generating the worm. On the bar that replaces the worm, a tool or tools are so mounted that the lines of their cutting edges when projected intersect the center line of the bar, and are placed in such a position that the cutting edges will generate the correct angle, pitch and twist on the teeth to fit the angle, pitch and twist that are generated on the worm. The centerline of the cutter-bar and the axis of the wheel blank are set to correspond to the centers of the worm and wheel respectively. A means is provided for extending or shortening the length of the cutters in relation to the center of the cutter-bar.

In starting to generate the teeth on the worm wheel, the cutters are set to the shortest required radius, and as the work progresses the radius is lengthened until the maximum length desired is reached. The cutting edge of the cutter is always set at 90 degrees to the centerline of the bar and moves out from the center in a straight line. It can be seen that passing through the wheel it must cut a straight line radiating from the centerline of the bar, and will generate an angle on the tooth of the wheel. This angle depends on the position of the cutter in relation to a line drawn at 90 degrees from the centerline of the cutter bar and intersecting the center of the wheel. This distance is equal to the radius of a circle co-axial with the axis of the wheel, said circle being definitely fixed by the angles of the teeth on the gear wheel, and in a manner hereinafter described. It can be readily seen that, as the cutters revolve through the wheel while the tooth that is being cut on the wheel is advancing in rotation, it follows that the cutters must generate the proper twist to the teeth.

It will be noted that if the cutters that cut the corresponding sides of both the worm thread and the wheel teeth be mounted for rotation at the same time, their edges or lines of action in traversing their paths may be brought coincident with each other in the axial section or mid-plane and at a predetermined distance from a line drawn at 90 degrees from the center line of the worm or cutter bar and intersecting the axis of the revolving table and if the distances between the axis of the revolving table and the center line of the worm or cutter-bar remains constant the generated angle and pitch must be the same in the mid-plane for both the worm and the wheel, the generated twist for both varying only the minimum thus giving the maximum bearing surface that it is possible to obtain.

One of the advantages of my invention is that when the angle of the gear wheel tooth has been selected, by utilizing my invention both the worm and the worm wheel can be definitely generated to the same pitch, and therefore when one convolution of the thread of the worm is in contact with a tooth of the worm wheel, every convolution of the worm thread will be in contact with its mating tooth of the wheel. For this reason the worm and wheel cannot wear out of pitch with each other, no matter how much the gearing wears or how much backlash occurs. They will always be in pitch and every thread convolution on the worm will be in bearing with a tooth on the wheel until the gears are worn out.

With these and other objects in view, my invention comprises the generating of the worm and worm wheel, which are set forth in the following specifications, and illustrated in the accompanying drawings. In the accompanying drawings annexed hereto, I have shown my invention embodied in one form of worm gearing having a single threaded worm, but it can be made with multiple threads. It will be understood that the invention can be otherwise embodied and that the drawing is not to be construed as defining or limiting the scope of the invention, the claims appended to this specification being relied upon for this purpose.

Fig. 2 shows a method of generating the flanks of the teeth of the periphery of the worm wheel; and Fig. 3 shows a method of generating the flanks of the thread on a worm made in accordance with the present invention.

Figure 1:
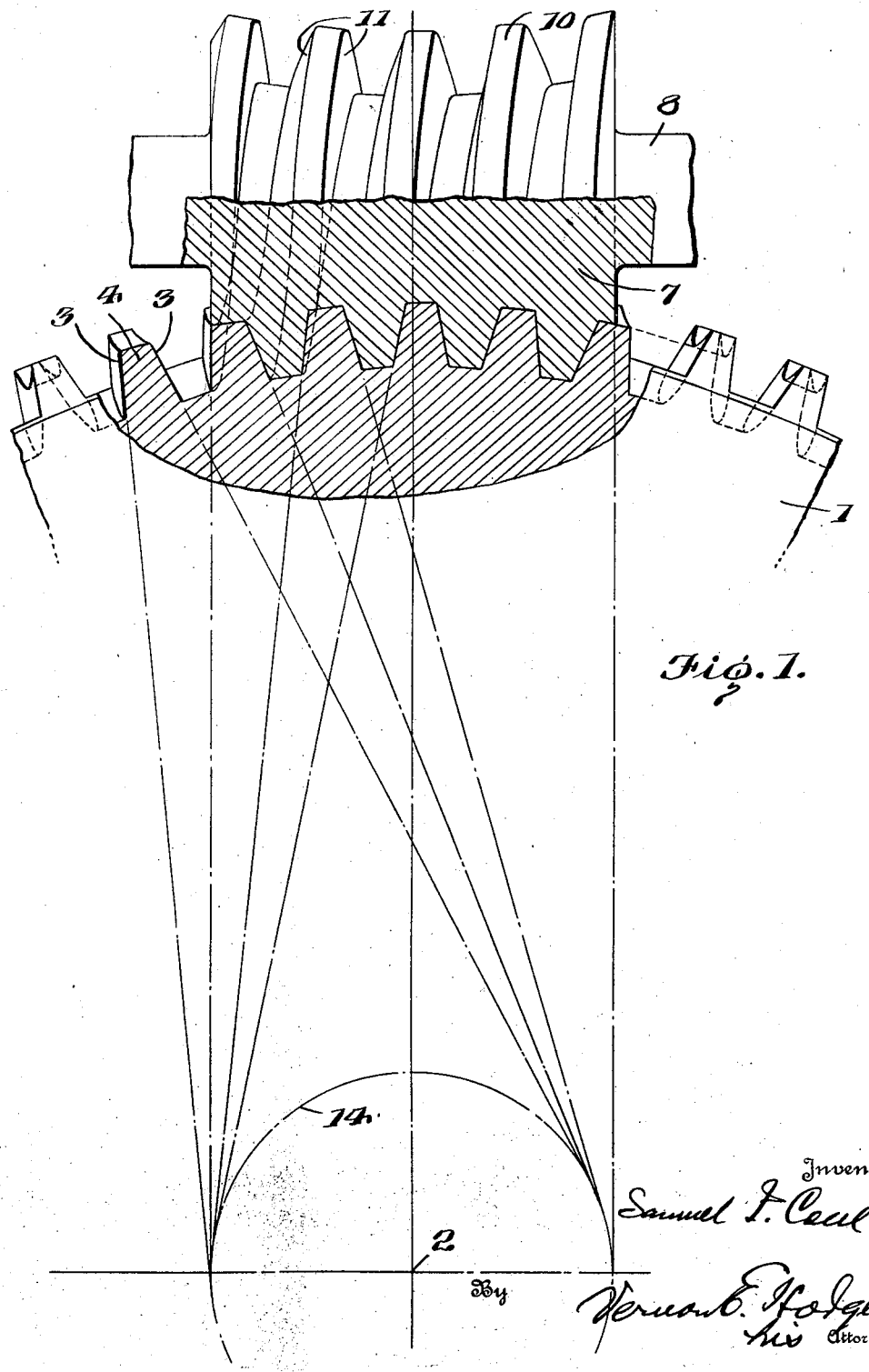
Fig. 1 shows a view partly in section of a worm and a worm wheel made in accordance with one of the modifications of the present invention.

Briefly, my invention in its broadest aspect comprises an improved method of generating worms of the hourglass type and worm wheels having the correct angle, pitch, and twist, thereby producing the maximum amount of contact between the flanks of the worm thread and corresponding flanks of the teeth of the worm wheel throughout the length of the worm; the said maximum contact being secured by locating the cutting edge of a tool or tools at a certain predetermined position and by maintaining a constant distance between the centers of rotation and then feeding said tool or tools into the blanks in a certain designated manner, all of which is clearly set forth in this application.

In the usual or common method heretofore employed for forming the two members of a Hindley system, the worm is made first and then a hob of a form similar to that of the worm and whose cutting edges correspond with its thread. Lastly, the wheel teeth are cut by bringing the rotating hob into the desired position with respect to the rotating wheel blank. The result of this operation is that in the development of the wheel teeth the hob convolutions do not work in harmony with each other, one convolution seating itself by removing material which is subsequently needed by another in seating itself.

To modify these irregularities subsequent alterations to either the worm thread or wheel teeth, or both are employed to affect an adjustment, the results being at the best faulty and indefinite.

By employing the methods described in the present invention, the worm and the wheel may each be completed and independently possessed of the ideal mating qualities.

In Fig. 1 a worm wheel is shown at 1 in mesh with a worm 7, both possessing the form resulting from the use of methods described in the present invention. The sectional portion shown is taken at the axial section or mid-plane in which plane each of th sides 11 of the thread 10 is coincident with one of the sides 3 of the teeth 4, all being straight at this mid-plane section. The teeth 4 of the wheel 1 are equally spaced and their sides 3 are twisted as clearly shown.

As shown in Fig. 2, these twisted surfaces, forming the flanks 3 of the gear teeth, are easily generated by the cutting edges of the tools 5 mounted to rotate about and at right angles to the axis of the bar 6, and are spaced apart a distance equal to the diameter of the circumscribed coaxial circle 14 and in line tangent thereto. The lines of the teeth of wheel 1 in Fig. 2 are shown at the mid-plane and since the tools 5 would rarely pass this plane simultaneously the wheel is broken and an additional dotted view of a portion of the wheel and cutter is shown, thus presenting the action of both tools in the mid-plane.

The coaxial circle circumscribed about the axis 2 of the gear wheel 1 is designated by the numeral 14, and its diameter is fixed by the angle of the teeth on the gear wheel when taken at the mid-plane. The length of the worm with which the gear wheel is to be intermeshed is preferably equal in length and never greater than the diameter of said circle. The flanks 3 of the teeth 4 are generated so that the line of projection of each flank in the mid-plane is tangent to this circle 14, and as shown in Fig. 2, the lines passing through the cutting edge of tools 5 are tangent to said circle.

One of the cutting tools 5 on cutter bar 6, and the blank for the gear wheel may be rotated simultaneously at a predetermined rate of speed relative to each other for generating one side of each tooth when the cutting tool may be either reversed or another tool used for generating the opposite side of said teeth, as shown in Fig. 2. Further, instead of reversing the cutting tool, it may remain the same and the gear blank may be reversed, if desired. Adjustable means is provided for simultaneously feeding the cutting tool or tools into the blank as the operation progresses. The lines 15 in Fig. 2 show the position of the tool or tools 5 at the beginning of the operation.

A worm 7 adapted to engage with worm wheel 1 is shown in Fig. 3. This is preferably generated integral on its shaft 8 and is adapted to be mounted to rotate about an axis 9 at right-angles to the axis 2 of the worm wheel 1. The worm 7 is generated with a continuous thread 10 extending about the worm 7 from end to end. The flanks or sides of this thread 10, which are shown at 11, are adapted to give contact with the flanks 3 of the teeth 4 of the worm wheel 1, and these surfaces 11 are so generated that they will intermesh properly with the gear wheel 1 and give contact with the flanks 3 on said gear wheel teeth throughout the arc of contact of worm 7 with worm wheel 1. The surfaces 11 are not of true helicoidal form, but are peculiar warped surfaces, which are generated in a novel manner, to give a conjugate form to their surfaces relative to the flanks 3 of the worm wheel 1.

The general shape of worm 7 is of the globoidal or hourglass worm type, and the thread 10 is adapted to contact with the teeth 4 of gear wheel 1 with a large surface contact on tooth 4 of gear 1 at the entering convolution of the thread 10 on the worm 7 and gradually diminishing in surface contact until it reaches the leaving convolution of the thread of said worm, at which place, it wipes a portion of the flank surface of tooth 4. Each of the teeth 4 on gear 1 within the arc subtended by the worm 7 is engaged by a portion of the thread 10.

The method of generating the worm 7 is clearly shown in Fig. 3. The tools 12 are mounted on a table 16 to revolve about the axis 2, and in the axial plane of the worm, and are so positioned that their sides coincide with a line that is tangent to a base circle 14, concentric with axis 2, and are provided with an adjustable means of moving them into worm 7, the lines 17 indicating the positions of tools 12 at the beginning of the operation. The extreme length of the surface of contact of the thread on worm 7 with the surfaces of teeth 4 on gear 1 is equal to the diameter of the base circle 14, and equals the distance between the positions where each of any pair of opposed flanks 11 of the thread 10 of worm 7 forms a right angle to axis 9 of worm 7. This length of contact surface on worm 7 is thus governed by the angle that it is desired to generate.

The cutting tools 12 for generating the worm are mounted on a table 16 to be revolved simultaneously with the rotation of the worm blank on its shaft 8 at a predetermined ratio of speed, so that these cutting tools are fed into the worm blank as the table with the tools thereon is rotated, the tools and worm blank being simultaneously rotated and positioned in accordance with my invention, the proper thread will be generated on the worm. The preferred means for carrying the invention into practice is disclosed in my application Serial No. 118,214.

For large speed reductions, between the worm and worm wheel, I preferably utilize a single threaded worm, and for a small speed reduction, I prefer to use a worm having a number of threads, commonly called double, triple or multiple threaded worms. Furthermore, the system permits generating the worms and worm wheels to the highest possible precision in pitch, angle and twist of teeth.

I claim:

1. The method of generating worm wheels consisting in simultaneously rotating an edge cutting tool and a wheel blank, said cutting tool being radiated while rotated in a plane parallel with and spaced apart from a plane passing through the axis of the wheel blank and perpendicular to the axis of rotation of the cutting tool, the cutting edge lying at all times entirely within a plane passing through the axis of rotation of said tool.

2. The method of generating worm wheels adapted for use with worms of the Hindley screw type consisting in simultaneously rotating an edge cutting tool and wheel blank about two axes perpendicular to each other to generate the faces of the worm wheel teeth, the cutting edge of said cutting tool being rotated and radiated in a plane parallel with and spaced apart from a plane passing through the center axis of the worm wheel blank and perpendicular to the axis of rotation of the cutting tool, t'.e cutting edge lying at all times entirely within a plane passing through the axis of rotation of said tool.

3. The method of generating worm wheels of the character described, consisting in rotating and radiating an edge cutting tool and a worm wheel blank simultaneously about two axes perpendicular to each other to generate the faces of the worm wheel teeth, the plane of the cutting edge of the tool being spaced apart from a plane passing through the axis of the worm wheel blank a distance equal to the radius of the co-axial circle formed by the projections of the faces of the worm wheel teeth, and said plane of the cutting edge of said tool being parallel with the axis of the worm wheel blank and perpendicular to the axis of rotation of said tool, the cutting edge lying at all times entirely within a plane passing through the axis of rotation of said tool.

4. The method of generating worm wheels of the character described, consisting in rotating and radiating an edge cutting tool and a worm wheel blank simultaneously about two axes perpendicular to each other to generate the faces of the worm wheel teeth, the plane of the cutting edge of the tool being spaced apart from a plane passing through the axis of the worm wheel blank a distance equal to the radius of the co-axial circle formed by the projections of the faces of the worm wheel teeth and said plane of the cutting edge of said tool being parallel with the axis of the worm wheel blank and perpendicular to the axis of rotation of said tool and the distance between said axes being maintained constant throughout the operation, and cutting teeth upon said wheel blank with a long helical twist and with sides at a constant angle to each other.

5. The method of generating worm wheels of the character described, consisting in rotating an edge cutting tool and a worm wheel blank simultaneously about two axes perpendicular to each other to generate the faces of the worm wheel teeth, the plane of the cutting edge of the tool being spaced apart from a plane passing through the axis of the worm wheel blank a distance equal to the radius of the co-axial circle formed by the projections of the faces of the worm wheel teeth, and said plane of the cutting edge of the tool being parallel with the axis of the worm wheel blank and perpendicular to the axis of rotation of said tool, the distance between said axes being maintained constant throughout the operation and the tool being advanced into the worm wheel blank by increasing its radial distance from the axis of rotation of the said tool, and cutting teeth upon said wheel blank with a long helical twist and with sides at a constant angle to each other.

6. The method of generating a worm of the Hindley screw type including rotating a generating tool and a worm blank simultaneously about axes perpendicular to each other, and at fixed center distances, and effecting relative radiation for generating the thread on the worm.

7. The method of generating a worm of the Hindley screw type consisting in rotating an edge cutting tool and a worm blank simultaneously about two axes perpendicular to each other to generate the thread on the worm, maintaining a constant fixed distance between said axes throughout the operation and gradually advancing the cutting tool into the worm blank along the line of the side of the thread, as the work progresses and cutting the worm thread with a long helical twist and with sides at a constant angle to each other.

8. The method of generating a worm of the Hindley screw type consisting in rotating edge cutting tools and a worm blank simultaneously about two axes perpendicular to each other to generate the thread on the worm, maintaining a constant fixed distance between said axes throughout the operation and gradually advancing the cutting tools into the worm blank along the lines of the sides of the thread, as the work progresses, and cutting the worm threads with a long helical twist and with sides at a constant angle to each other.

9. The method of generating worms of the character described, including simultaneously rotating an edge cutting tool and worm blank about two axes perpendicular to each other while effecting relative radiation, the cutting tool being rotated in a plane parallel to the axis of the worm blank and the plane of the cutting edge of said tool being perpendicular to the axis of rotation of said worm blank, the cutting edge lying at all times within a plane passing through the axis of rotation of the worm blank.

10. The method of generating worms of the character described, consisting in rotating an edge cutting tool and a worm blank simultaneously about two axes perpendicular to each other to generate the surfaces of the threads of the worm and effecting relative radiation, the plane of the cutting edge of the tool being parallel with and spaced apart from a plane passing through the axis of rotation of said tool a distance equal to the raduis of the co-axial circle formed by the projections of the faces of the worm wheel teeth with which the said worm is to mesh, and said plane of the cutting edge of said tool being perpendicular to the axis of rotation of the worm blank, the cutting edge lying at all times within a plane passing through the axis of rotation of the worm blank.

11. The method of generating worms of the character described, consisting in rotating an edge cutting tool and a worm blank simultaneously about two axes perpendicular to each other to generate the surfaces of the threads of the worm and effecting relative radiation, the plane of the cutting edge of the tool being parallel with and spaced apart from a plane passing through the axis of rotation of said tool a distance equal to the radius of the co-axial circle subtending the projections of the faces of the gear wheel teeth with which the said worm is to mesh and said plane of the cutting edge of said tool being perpendicular to the axis of rotation of the worm blank and the distance between said axes being maintained constant throughout the operation, the cutting edge lying at all times within a plane passing through the axis of rotation of the worm blank.

12. The method of generating worms of the character described, consisting in rotating an edge cutting tool and a worm blank simultaneously about two axes perpendicular to each other to generate the surfaces of the threads of the worm, the plane of the cutting edge of the tool being parallel with and spaced apart from a plane passing through the axis of rotation of said tool a distance equal to the radius of the co-axial circle subtending the projections of the faces of the gear wheel teeth with which the said worm is to mesh and said plane of the cutting edge of said tool being perpendicular to the axis of rotation of the worm blank and the distance between said axes being maintained constant throughout the operation and the tool being advanced into the worm blank by gradually increasing the distance between cutting end of said tool and a plane perpendicular to the plane of the cutting edge of said tool and passing through the axis of rotation of same, and cutting the worm thread with a long helical twist and with sides at a constant angle to each other.

13. In the method of generating worm gearing, which includes rotating a cutting tool and a blank simultaneously about two axes perpendicular to each other while effecting relative radiation, the improvement which consists in maintaining throughout the cutting operation a fixed distance between said axes.

14. In the production of gears of the Hindley type, the improvement which consists in generating the teeth by an end cutting operation under conditions which will insure throughout the operation a fixed distance between the axes of rotation, while radially feeding the cutter to the blank.

In testimony whereof I affix my signature.

SAMUEL I. CONE.